United States Patent

[11] 3,633,342

[72] Inventor Vernon C. H. Richardson
5312 Brae Burn, Houston, Tex.
[21] Appl. No. 827,330
[22] Filed May 23, 1969
[45] Patented Jan. 11, 1972

[54] APPARATUS FOR SEPARATING WATER AND PARTICULATE MATERIAL FROM FLOWING GASES
2 Claims, 2 Drawing Figs.

[52] U.S. Cl............................................. 55/228,
55/237, 261/76, 261/79 A, 261/116
[51] Int. Cl............................................... B01d 45/16
[50] Field of Search........................................... 55/29–31,
235, 236, 237, 238; 261/76, 79.1, 116

[56] References Cited
UNITED STATES PATENTS

| | | | |
|---|---|---|---|
| 1,740,462 | 12/1929 | Hutton........................ | 55/29 |
| 1,999,589 | 4/1935 | Frey............................ | 55/238 |
| 2,046,500 | 7/1936 | Carter......................... | 55/29 |
| 2,315,226 | 3/1943 | Rohlin......................... | 55/235 X |
| 2,539,344 | 1/1951 | Carraway.................... | 261/29 X |
| 3,177,634 | 4/1965 | Latham, Jr. et al.......... | 55/238 X |
| 3,311,355 | 3/1967 | Rait............................. | 55/29 |
| 3,345,046 | 10/1967 | Versluys et al. ........... | 55/238 X |

Primary Examiner—Tim R. Miles
Assistant Examiner—Steven H. Markowitz
Attorney—Charles E. Lightfoot

ABSTRACT: An in-line dehydrating and particle removing apparatus for use in gas lines. The apparatus comprises a tubular body adapted to be connected into a gas flow line and including means responsive to the flow of gas therethrough for imparting a swirling or spiralling movement to the gas to cause the separation therefrom of liquid and finely divided solid particles by centrifugal action. Means is also provided for spraying a suitable liquid, such as a glycal, or the like, into the flowing gas in response to a reduction of pressure therein to absorb water from the gas and to coat finely divided particles in the gas to cause separation of the same by centrifugal action. The apparatus includes means responsive to the flow of gas therethrough for causing removal of the separated materials from the gasline and means for separating solid particles from the materials thus removed and returning the liquid portion thereof to the flowing gas for reuse in the separation of further water and particles.

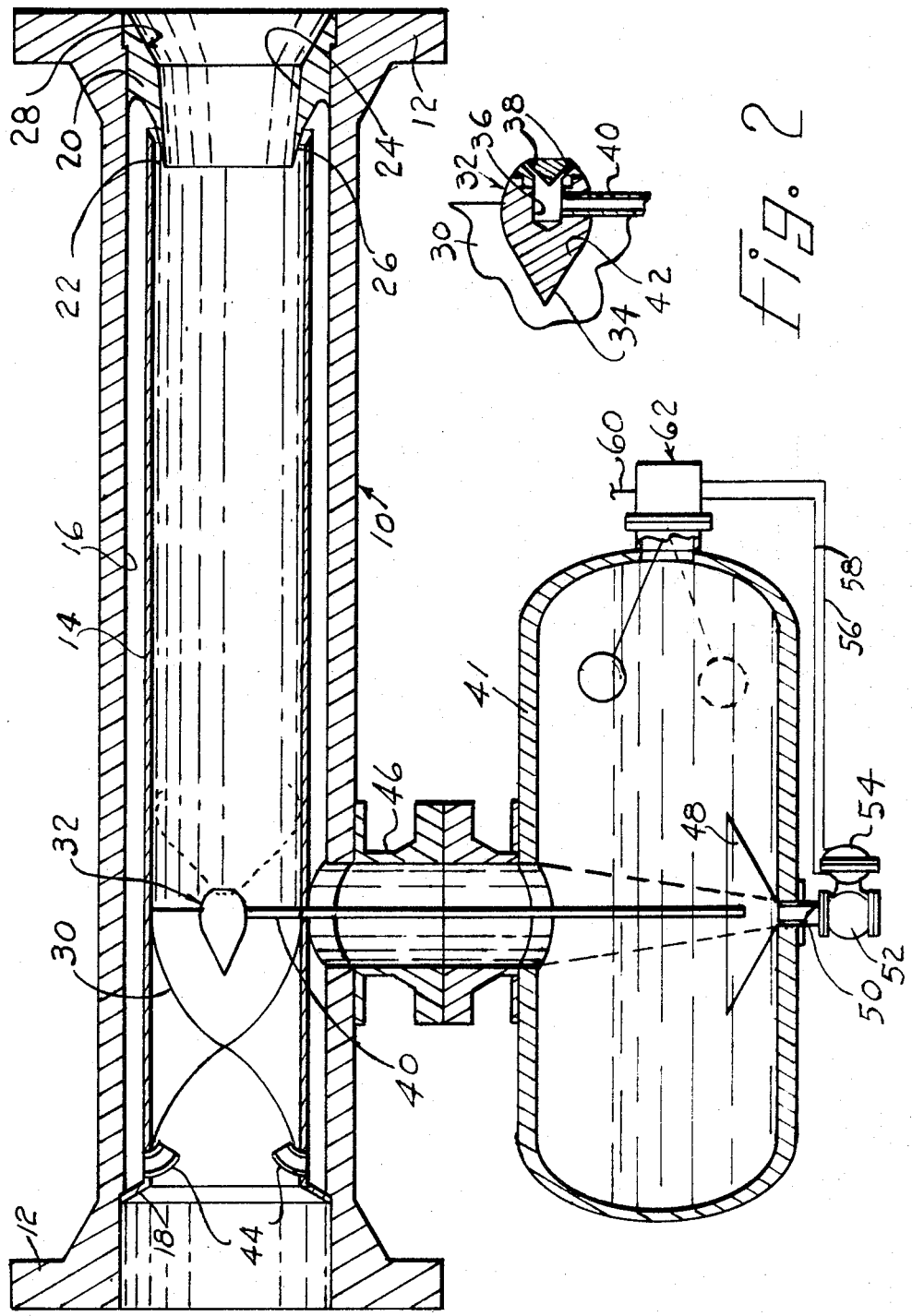

3,633,342

APPARATUS FOR SEPARATING WATER AND PARTICULATE MATERIAL FROM FLOWING GASES

BACKGROUND OF THE INVENTION

In the production of gases from wells or other sources, such gases frequently contain water vapor, which at times may condense at various locations to interfere with the proper functioning of equipment used in connection with the production and distribution of the gas. At times the temperature of the gases may be greatly lowered by expansion to cause the formation of crystalline hydrates or ice which may build up or accumulate in the flow line to an extent to interfere with the flow of gas or the operation of equipment, such as valves, meters, or the like.

The reduction of the water content of the gas or complete removal of the same has been attempted heretofore by various types of apparatus which are subject to a number of serious disadvantages in that as heretofore commonly constructed they cannot be readily applied to a gas flow line without substantial interference with the flow of gas. Some gas driers used for this purpose are also inefficient and require constant attention and maintenance, as well as being very expensive to build and operate.

A further problem frequently encountered in the operation of gaslines is the presence in the gas of finely divided solids, such as crystals of sulfur, particles of dust or sand, talc, or the like, which cannot be readily removed, but which may settle out or accumulate at locations to interfere with the operation of the line.

Attempts have been made heretofore to remove water from flowing gaslines by causing the gas to move circumferentially therein to remove the water by centrifugal action. The effective removal of water in this manner is sometimes unsatisfactory, especially under conditions in which the water is in a vaporous state not readily separated by centrifugal force of the magnitude obtainable in a flow line of limited diameter. Moreover, very finely divided solids, such as those having a particle size below 404 are not sufficiently affected by centrifugal action to be readily removed by apparatus of this kind.

SUMMARY OF THE INVENTION

Briefly described, the gas treating apparatus of the present invention is of the inline type, adapted to be connected into a flow line without substantially interfering with the flow of gas therein and which imparts a swirling or spiralling motion to the gas to cause separation of water and solid particles by centrifugal action, whereby such entrained materials are thrown against the surrounding wall of the pipe. The apparatus includes means for introducing a spray or mist of suitable hygroscopic material such as glycols, glycerin, or the like, into the gas during the swirling or spiralling of the same to absorb water vapor and deposit the same with the absorbent material against the surrounding wall of the pipe.

The apparatus also includes means responsive to the flow of gas through the apparatus for causing a flow of fluid along the internal surface of the pipe to carry the absorbent material with the water and particles to a location to be removed from the line. The means for causing such flow comprises an elongated chamber or outflow passageway located externally of the flow way and having an inlet through which material may flow from the internal surface of the pipe into the chamber, and pressure reducing means disposed in the flow line in position to cause a reduction in the pressure in the chamber in response to the flow of gas in the line to cause the separated material to be drawn into the chamber. Means is provided for removing the separated material from the chamber, separating solids therefrom and reintroducing the liquid into the flow line as a spray or mist, whereby the absorbent liquid may be recycled through the apparatus.

BRIEF DESCRIPTION OF THE VIEWS OF THE DRAWINGS

FIG. 1 is a side elevational view, partly in longitudinal, central cross section, illustrating a preferred embodiment of the invention; and, FIG. 2 is a fragmentary, longitudinal, cross-sectional view, on a somewhat enlarged scale, showing details of structure of the spraying or misting nozzle of the apparatus.

DETAILED DESCRIPTION OF A PARTICULAR EMBODIMENT OF THE INVENTION

The apparatus of the invention comprises a tubular body 10, which may conveniently take the form of a section of pipe of a size at least equal in internal diameter to that of the gasline into which the apparatus is to be connected and which may be provided at its ends with suitable means, such as the external flanges 12, by which the body may be connected into the line.

Within the body 10 an internal flow pipe 14 is disposed, which is of somewhat smaller diameter than the body, and which is positioned in radially inwardly spaced relation to the internal surface of the body to form therewith an elongated, annular outflow chamber 16.

The flow pipe 14 is formed at its inlet end with an external outwardly flared portion or mouth 18, through which gas may flow into the flow pipe and which closes the forward end of the chamber 16.

The downstream end of the flow pipe 14 is open and extends over the inlet end of an outlet fitting of bushing 20, in radially outwardly spaced relation thereto to form an annular discharge passageway 22 into the chamber 16. The fitting 20 is fitted into the downstream end of the body 10 and has a bore 24 therethrough which tapers longitudinally inwardly to provide an inner end wall portion 26 whose outside diameter is substantially smaller than the inside diameter of the downstream end of the flow pipe 14 into which the fitting is extended to form the annular passageway 22.

At its outer end the fitting 20 may have an outwardly flaring, bevelled end face 28.

Within the forward end of the flow pipe 14 inwardly of the mouth 18 thereof, a spiral vane 30 is disposed, which may take the form of an elongated twisted platelike member, shaped to cause a swirling or spiralling movement of the gas flowing through the line. The spiral vane 30 may, of course, be of any desired length and the turns thereof may be at any desired pitch and any number of such turns may be provided. By this arrangement, gas flowing through the apparatus is caused to move in a spiral or swirling path along the flow pipe to impart centrifugal force thereto by which relatively heavy materials, such as water vapor or finely divided solids are thrown radially outwardly against the inner surface of the flow pipe to separate such materials from the gas.

For the purpose of introducing a mist or spray of suitable material, such as glycerine, glycals, water-absorbent material, or the like, into the gas during the swirling movement of the same, a nozzle device, generally designated 32, is provided, which may be in the form of a generally teardrop-shaped body positioned centrally in the flow pipe with its pointed end 34 directed upstream at or near the downstream end of the vane 30. The nozzle member 32 has an internal central cavity 36, from which a number of small discharge passageways 38 lead to the exterior at the downstream end of the nozzle and are directed somewhat radially outwardly to direct the spray into the gas toward the surrounding wall of the flow pipe.

A liquid supply pipe 40 is connected to the nozzle 32 in communication with the cavity 36 thereof which leads from a collection receptacle or tank 41, from which the absorbent liquid is supplied to the nozzle.

The nozzle member 32 may be conveniently supported in the flow pipe by inserting the same in an end notch 42 formed in the downstream end of the vane 30 and securing the same in place in any convenient manner, as by welding or soldering.

One or more discharge pipes or nozzles 44 are disposed within the upstream end of the flow pipe 14, which preferably take the form of small curved pipes or elbows tapering toward their outlet ends and in communication at their inlet ends with the interior of the chamber 16. The nozzles 44 are directed downstream in the flow pipe, to cause a reduction in the pressure in the chamber 16 during the flow of gas through the line, whereby the material deposited on the internal surface of the flow pipe will be drawn into the chamber through the annular passageway 22 and be moved toward the forward end of the chamber.

The body 10 has a side outlet pipe 46 which is in communication with the interior of the chamber 16 mediate the ends of the chamber and which leads downwardly therefrom into the reservoir or tank 41 to allow the outflow of material from the chamber into the tank.

Within the tank 41 a funnellike receptacle 48 is located beneath the outlet pipe 44 to receive solids which are deposited from the liquid collected in the tank, and which is disposed to discharge the solids from the tank through a discharge pipe 50, under the control of a discharge valve 52. The valve 52 may conveniently be of a type which is diaphragm operated by diaphragm mechanism 54 of a conventional type having pressure fluid lines 56 and 58 in communication with the interior of a diaphragm casing on opposite sides of a flexible diaphragm operatively connected to the discharge valve.

The diaphragm mechanism is constructed to be supplied with pressure fluid for operation of the diaphragm through a supply pipe 60 from any suitable source of fluid under pressure under the control of a float valve, generally designated 62, which is operated by a float 64 located in the tank 41.

By this arrangement a rise in the level of liquid in the tank causes the float valve to operate to open the discharge valve 52 to allow an outflow of liquid from the tank through the pipe 50 carrying with it accumulated sludge or solid particles from the receptacle 48 and lowering the liquid level in the tank until the float valve is operated to close the discharge valve.

In making use of the invention the apparatus is connected into a gas flow line and the tank 41 is partly filled with a hygroscopic liquid such as ethylene glycol, propylene glycol, or other such suitable water-absorbing material.

With the apparatus thus applied, the flow of gas through the flow pipe 14 causes the stream of gas to follow a swirling or spiral path, due to the vane 30, whereby water vapor and finely divided solid particles are thrown by centrifugal action against the surrounding wall of the pipe. The reduction in pressure caused by the venturi effect of the body of the nozzle 32 and the increased velocity of the gas as it passes along the flow tube, results in the withdrawal of liquid from the tank 41 through the pipe 40, which is sprayed into the flowing gas to absorb water therefrom and to wet finely divided solid particles entrained in the gas which are then thrown by centrifugal action against the wall of the pipe. Due to the wetting action of the liquid particles of solid matter are prevented from bouncing away from the wall and are retained thereon by the liquid.

The flow of gas through the flow pipe 14 also produces a reduction in the pressure in the chamber 16 from which gas is drawn out through the nozzles 44 to cause the separated liquid passing along the inner surface of the flow pipe to be drawn into the chamber through the passageway 22. The separated liquid thus drawn off into the chamber then flows back along the chamber and out through the pipe 46 into the tank 41.

Solid particles in the liquid may settle into the funnel 48 to be discharged therefrom with excess liquid upon opening of the discharge valve 52 when the float valve 62 is opened in response to a rise in liquid level in the tank.

The recovered liquid in the tank is recycled into the apparatus through the pipe 40.

In the event that the hygroscopic liquid employed becomes saturated with water or absorbs water to an extent that it is no longer efficient, the liquid may be drawn off from the tank 41 and replaced with dehydrated liquid, or suitable means of a usual type, not shown, may be incorporated in the apparatus for removing excess water from the liquid.

It will thus be seen that the invention, constructed as described above, provides apparatus for the treatment of the flowing gas to remove water and solid particles therefrom, which is efficient in operation, presents no substantial interference to the flow of gas, and whose operation and maintenance is economical.

Having thus clearly shown and described the invention, what is claimed as new and desired to secure by Letters Patent is:

1. In apparatus for treating a flowing gas to remove therefrom water and finely divided solids:
   a. a tubular body adapted to be connected into a gas flow line;
   b. an inner tubular member in the body having a portion spaced radially inwardly from the wall of the body to form a flow way through the member and an annular chamber surrounding the flow way;
   c. means forming an outlet from the flow way into said chamber adjacent one end of the chamber;
   d. means in the flow way positioned for contact with the gas flowing through the flow way to impart a swirling movement to the gas to apply a centrifugal force to particles in the gas tending to move such particles radially toward the surrounding wall of the member;
   e. means responsive to the flow of gas through the flow way for introducing into the gas a liquid capable of absorbing water from the gas; and,
   f. means responsive to the flow of gas through the flow way for causing a reduction in the pressure in said chamber to cause an outflow of such liquid together with the water absorbed thereby from the flow way through said outlet.

2. The gas-treating apparatus as claimed in claim 1, wherein said means for introducing said liquid into said gas includes
   i. nozzle means positioned in said flow way;
   j. means forming a passageway through which fluid may flow from the chamber into the flow way through said nozzle means; and,
   k. means in said flow way positioned for coaction with the gas flowing through the flow way to cause a reduction in pressure in the flow way at a location to cause an outflow of liquid into the flow way through said nozzle means.

* * * * *